United States Patent [19]

Graham et al.

[11] Patent Number: 5,454,189

[45] Date of Patent: Oct. 3, 1995

[54] BOUQUET HOLDER

[76] Inventors: Kimberley D. J. Graham; Gene A. Duguay, both of 2166 Fasthill Drive, Peterborough, Ontario, K9L 1X3 Canada

[21] Appl. No.: 235,843

[22] Filed: Apr. 29, 1994

[30] Foreign Application Priority Data

Aug. 18, 1993 [CA] Canada ................................. 2104310

[51] Int. Cl.⁶ ............................... A01G 5/00; A47G 7/00
[52] U.S. Cl. ......................................... 47/41.12; 47/41.01
[58] Field of Search ............................. 47/41.12, 41.01, 47/41.13

[56] References Cited

U.S. PATENT DOCUMENTS

| 1,617,280 | 2/1927 | Viggiano | 47/41.01 |
| 2,799,972 | 7/1957 | Teixeira | 47/41.01 |
| 3,828,472 | 8/1974 | Vermeulen et al. | 47/41.01 |
| 4,788,792 | 12/1988 | Womick | 47/41.12 |

FOREIGN PATENT DOCUMENTS

| 2093436 | 9/1982 | United Kingdom | 47/41.12 |
| 2187092 | 9/1987 | United Kingdom | 47/41.12 |
| 2224438 | 5/1990 | United Kingdom | 47/41.12 |

Primary Examiner—Michael Powell Buiz
Assistant Examiner—Joanne C. Downs
Attorney, Agent, or Firm—Barrigar & Moss

[57] ABSTRACT

A flower bouquet holder is disclosed having a base or tray and a handle depending downwardly therefrom. A first cage member is releasably mounted on the tray. One or more additional cage members are releasably attached to either the tray or the first cage member. The cage members contain synthetic plastic foam for mounting flower stems therein. The cage members can be detached making separate smaller flower bouquets out of the larger bouquet formed with all of the cage members being assembled.

8 Claims, 4 Drawing Sheets

BOUQUET HOLDER

FIELD OF THE INVENTION

This invention relates to flower bouquet holders, or forms for mounting flowers to form a bouquet, and particularly, to a holder for making a bride's bouquet.

BACKGROUND OF THE INVENTION

In making a bride's bouquet, it is common to use a holder having a cone-shaped base, a handle depending from the base, and a cage structure mounted on the base containing synthetic foam. Flower stems or other decorative articles are mounted on the holder by inserting the stems or parts of the articles themselves into the synthetic foam. If the flowers are real, the foam is saturated with water to keep the flowers fresh as long as possible.

Examples of such holders are shown in United States Pat. Nos. 4,204,365 issued to Heikki S. Hirvi; 4,566,221 issued to Jacqualine Kossin, and 5,070,644 issued to Doris M. Hasty. While these bouquet holders are quite adequate for the purpose, only a single bouquet can be made using each holder. The present invention has a plurality of detachable flower holding members, so that a bouquet formed on the holder can be divided into two or more smaller bouquets. A bride can then give one or more of the smaller bouquets away to a mother or grandmother, for example, for sentimental reasons, and still throw the main bouquet in the traditional manner.

SUMMARY OF THE INVENTION

According to the invention, there is provided a flower bouquet holder comprising a tray, a handle depending downwardly from the tray, a first cage member releasably mounted on the tray, and a second cage member located beside the first cage member and releasably attached to one of the tray and the first cage member, the cage members containing synthetic plastic foam for mounting flower stems therein.

BRIEF DESCRIPTION OF THE DRAWING

Preferred embodiments of the present invention will now be described, by way of example, with reference to the accompanying drawings, in which.

DESCRIPTION OF THE PREFERRED EMBODIMENTS

Figure 1:
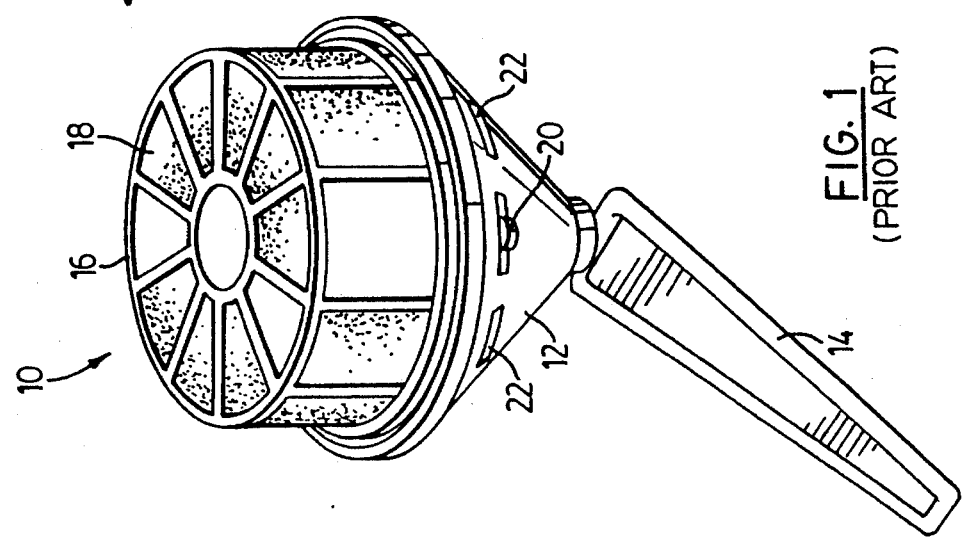
FIG. 1 is a perspective view of a conventional, prior art, bouquet holder.

Referring firstly to FIG. 1, a conventional bouquet holder is generally indicated by reference numeral 10 and has a base or tray 12 and a handle 14 depending downwardly therefrom. A cage member 16 containing synthetic foam material 18 is mounted on base 12 by having tabs 20 projecting through openings 22 in the walls of base 12.

Figure 2:
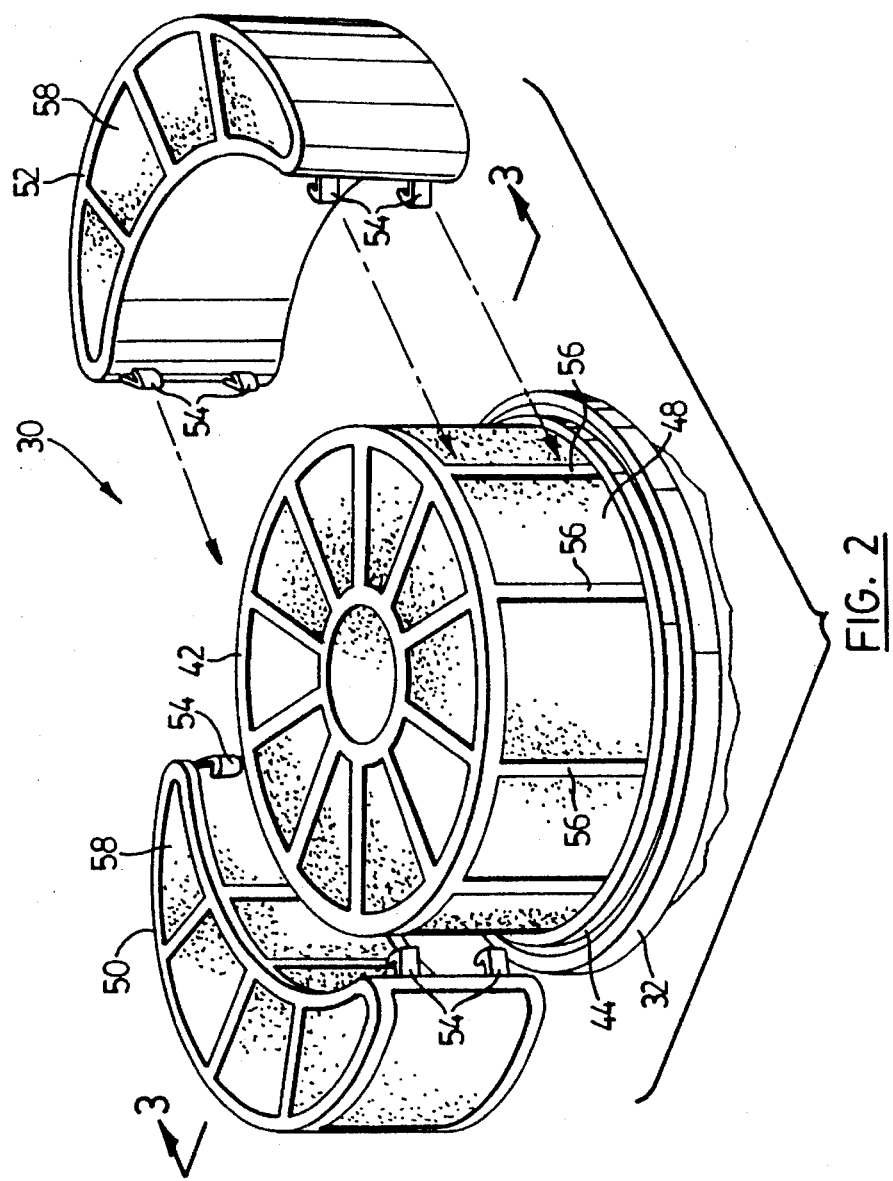
FIG. 2 is an exploded perspective view of the top portion of one preferred embodiment of the present invention.
Figure 3:
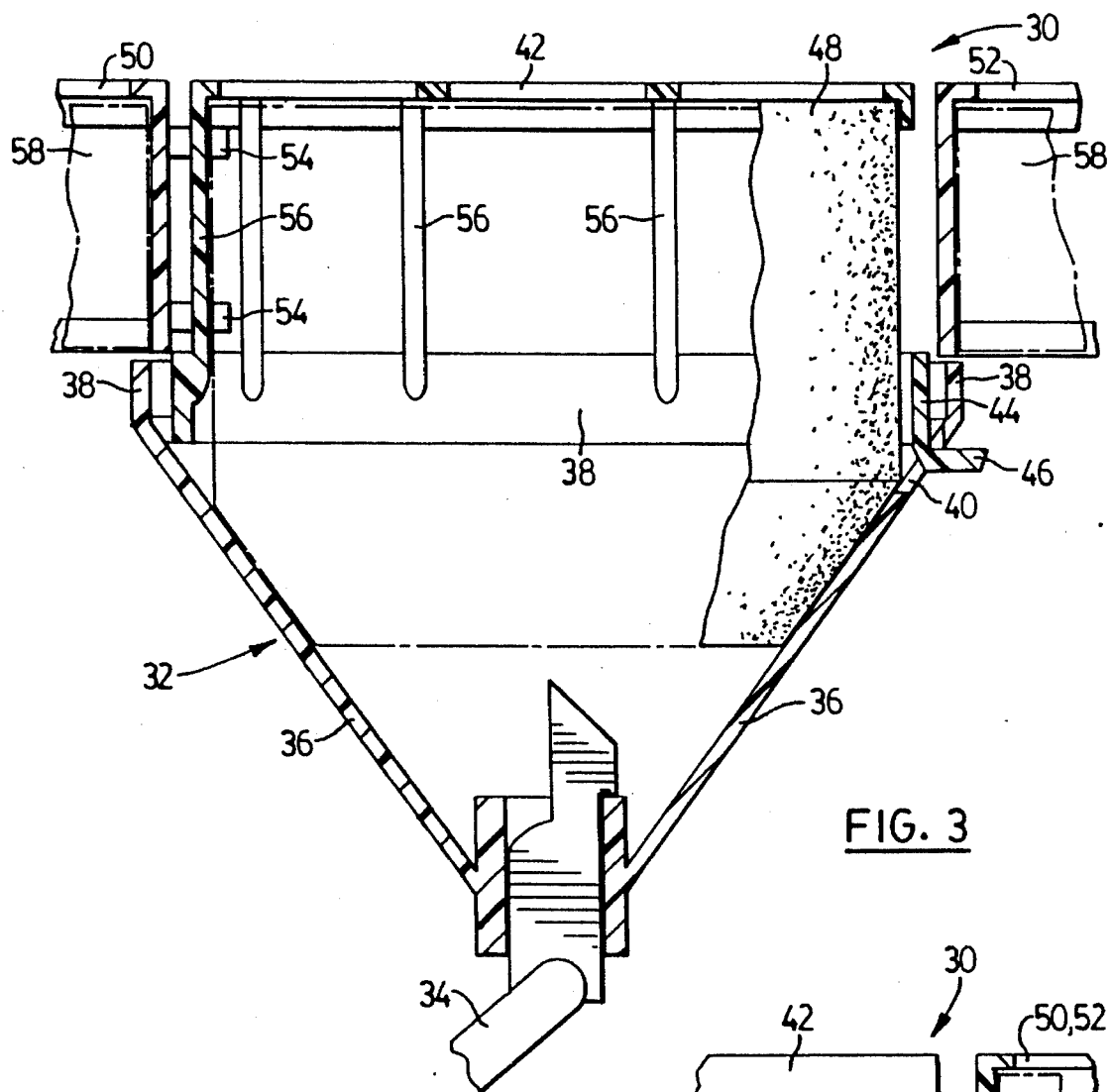
FIG. 3 is a vertical, sectional view, partly broken away; taken along lines 3—3 of FIG. 2.

Referring next to FIGS. 2 and 3, a preferred embodiment of a bouquet holder according to the present invention is generally indicated by reference numeral 30. Bouquet holder 30 includes a cone-shaped tray 32 and a handle 34 depending downwardly and outwardly from the bottom or apex of the cone. Tray 32 has generally upright sides 36 extending upwardly and outwardly from handle 34 to a peripheral, upright, annular rim 38. Sides 36 have a plurality of openings 40 spaced around and below rim 38.

A first cage member 42 has a lower, peripheral, annular flange 44, the latter having a plurality of spaced-apart outwardly disposed tabs 46 located in openings 40 to hold first cage member 42 on tray 32. First cage member 42 is formed of a suitable plastic material such that it is resilient allowing peripheral flange 44 to be squeezed inwardly to remove tabs 46 from openings 40, and thus detach first cage member 42 from tray 32.

A block of synthetic, plastic foam 48 or other suitable water-retaining foam is located inside first cage member 42 for mounting flowers and other articles in holder 30 by inserting the stems of the flowers into foam 48. First cage member 42 is detachable from tray 32 for insertion or replacement of foam block 48, but normally first cage member 42 is not intended to be detached from holder 30 in use.

Second and third cage members 50, 52 are located beside first cage member 42 and are releasably attached to first cage member 42 by a plurality of spaced-apart, resilient, lateral hook members 54 which clip onto upright ribs 56 of first cage member 42 to releasably attach the second and third cage members 50, 52 thereto. Second and third cage members 50, 52 can be detached from flower holder 30 by bending hook members 54 outwardly to disengage ribs 56.

Second and third cage members 50, 52 also contain synthetic, plastic foam 58 for mounting flower stems, etc. therein. It will be noted that second cage member 50 is a completely open cage structure, whereas third cage member 52 has closed sides and can also have a closed bottom, if desired, to give a more aesthetically pleasing appearance to third cage member 52 when it is detached from first cage member 42. It will be appreciated that the open structure of second cage member 50 or the closed-sided structure of third cage member 52 can be used interchangeably, as desired.

Figure 4:
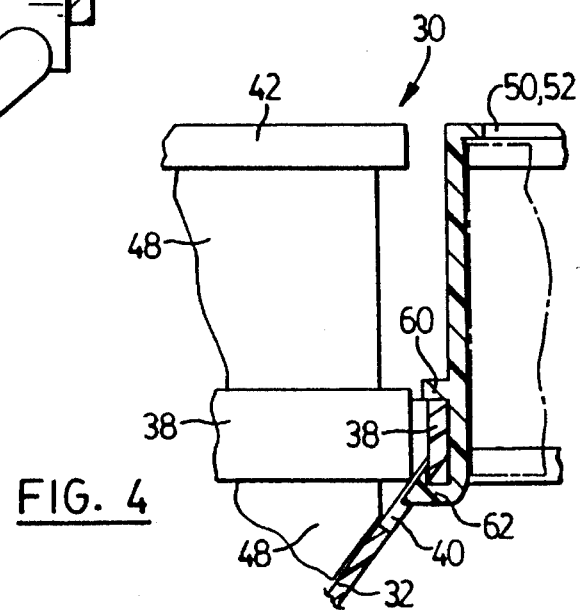
FIG. 4 is a partial, vertical sectional view showing an alternative embodiment for attaching a flower-holding cage member to the flower holder.

FIG. 4 shows another preferred embodiment for releasably attaching second and third cage members 50, 52 to flower holder 30. In this case, the second and third cage members 50, 52 are releasably attached to tray 32, rather than first cage member 42. In this embodiment, second and third cage members 50, 52 have a plurality of C-shaped clips 60 with lower resilient, hooked fingers 62 which snap over and clamp onto annular rim 38 of tray 32. It will be noted that fingers 62 are located in the same openings 40 used for tabs 46 of first cage member 42. It is only necessary for first cage member 42 to have a few tabs 46 located in openings 40 to hold first cage member 42 in place. Fingers 62 of clips 60 of second and third cage members 50, 52 fit into any free remaining openings 40. Two clips 60 spaced apart along the lower peripheral edge of each of second and third cage members 50, 52 are sufficient to hold second and third cage members 50, 52 in place, but more clips 60 can be used, if desired. Second and third cage members 50, 52 are detached from holder 30 simply by rotating cage members 50, 52 downwardly away from first cage member 42 to pull clips 60 off annular rim 38.

Figure 5:
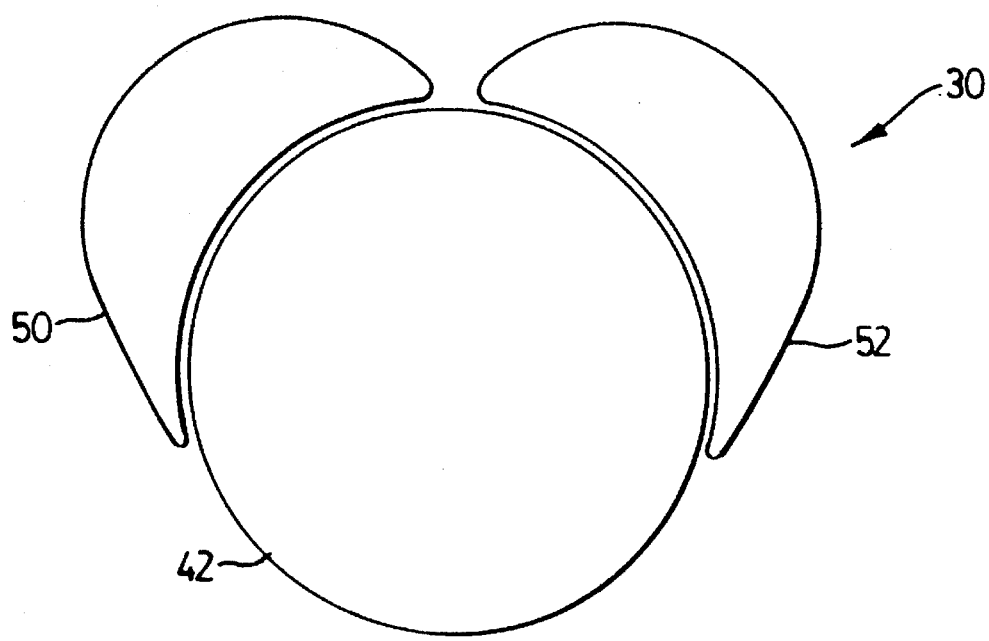
FIG. 5 is a schematic, plan view showing a first central cage member and two crescent-shaped cage members arranged generally into the shape of a heart.
Figure 6:
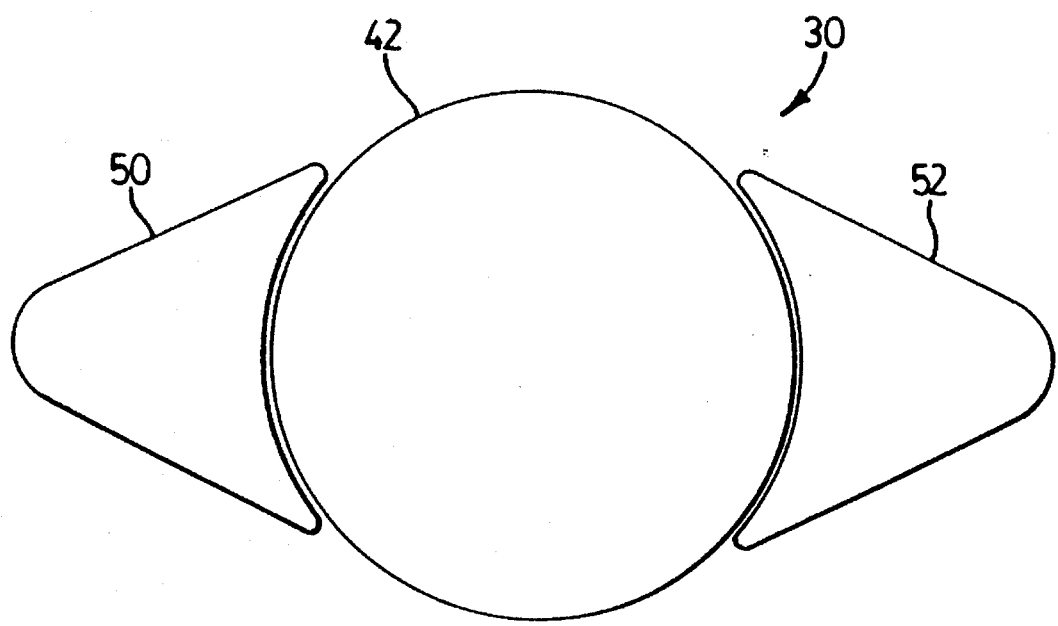
FIG. 6 is a schematic, plan view showing a first central cage member and two triangular cage members arranged generally into the shape of a diamond.

Referring next to FIGS. 5 and 6, schematic plan views are shown to illustrate the various shapes that first, second and third cage members 42, 50 and 52 can take. In FIG. 5, first cage member 42 is generally circular in plan view, and second and third cage members 50, 52 are crescent-shaped in plan view, so that flower holder 30 is generally heart-shaped when second and third cage members 50, 52 are attached to holder 30. In FIG. 6, first cage member 42 is again circular in plan view, but second and third cage members 50, 52 are generally triangular in plan view and located on opposite sides of first cage member 42, so that the three cage members together are diamond-shaped in plan view. It will be appreciated that in either embodiment shown in FIGS. 5 or 6, the second and third cage members 50, 52 can be located beside one another or spaced anywhere else around the periphery of first cage member 42, as desired.

Figure 7:
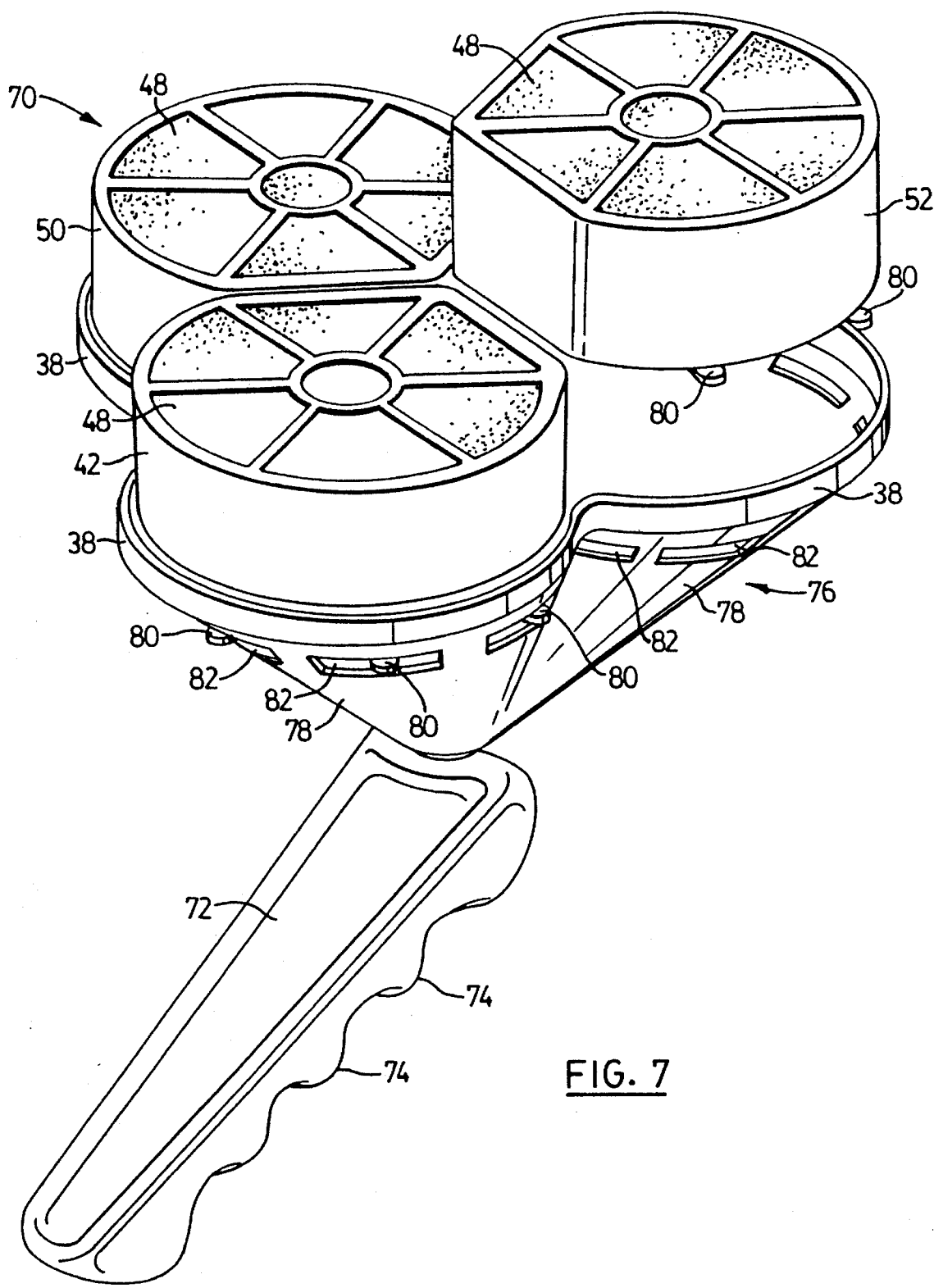
FIG. 7 is a perspective, partially exploded view of yet another embodiment of a bouquet holder according to the present invention.

Referring next to FIG. 7, another embodiment of a flower holder according to the present invention is generally indicated by reference numeral 70. In flower holder 70, handle 72 has been made more substantial with finger grips 74. Tray 76 has been formed with three partial sub-cones 78 making rim 38 into three partial annular rims giving a three-ring effect in plan view. In this embodiment, first, second and third cage members 42, 50 and 52 are all identical and shaped in plan view to fit within tray rim 38. It will be noted also that in this embodiment, each of the first, second and third cage members 42, 50, 52 has spaced-apart, lower, outwardly-disposed tabs 80 that fit into spaced-apart openings 82 to releasably attach all three cage members to tray 76. It will be appreciated, also, that in this embodiment, although cage members 42, 50 and 52 are identical and shaped in plan view to fit within tray rim 38, the shape of tray 76 could be changed to accommodate first, second and third cage members 42, 50 and 52 as shown in FIGS. 5 and 6. The embodiment shown in FIG. 7 is generally heart-shaped in plan view, but tray 76 could be changed so that all the cage members are aligned or formed in a line, as desired. It will also be noted that in the embodiment shown in FIG. 7, first, second and third cage members 42, 50 and 52 have closed sides. They also have a closed bottom to help the foam 48 retain water, but the sides and bottoms of the cage members could be open at the sides as well as the tops, if desired.

It will be apparent to those skilled in the art that in light of the foregoing disclosure, many alterations and modifications are possible in the practise of this invention without departing from the spirit or scope thereof. For example, only one detachable cage member in addition to the first central cage member could be used, if desired. Similarly, more than two detachable cage members could be used as well. Accordingly, the scope of the invention is to be construed in accordance with the substance defined in the following claims.

What we claim is:

1. A flower bouquet holder comprising: a tray having a peripheral, annular rim; a handle depending downwardly from the tray; a first cage member releasably mounted on the tray; a second cage member located beside the first cage member and being formed with a plurality of C-shaped clips having resilient hooked fingers for releasably clamping the second cage member onto said annular rim; and said cage members containing synthetic plastic foam for mounting flower stems therein.

2. A flower bouquet holder as claimed in claim 1 and further comprising a third cage member, the first cage member being circular in plan view, and the second and third cage members being crescent-shaped in plan view and located beside one another, so that the three cage members together are heart-shaped in plan view.

3. A flower bouquet holder comprising: a tray; a handle depending downwardly beneath the tray; a first cage member releasably mounted on the tray; second and third cage members located beside the first cage member; a plurality of spaced-apart, resilient lateral hook members formed on the second and third cage members which clip onto the first cage member for releasably attaching the second and third cage members onto the first cage member; said cage members containing synthetic plastic foam for mounting flower stems therein, the first cage member being circular in plan view, and the second and third cage members being crescent shaped in plan view and located beside one another, so that the three cage members together are heart-shaped in plan view.

4. A flower bouquet holder comprising: a tray; a handle depending downwardly form the tray; the tray having generally upright sides extending from the handle to a peripheral rim; said sides having a plurality of openings spaced around and below the rim; first and second cage members formed with a plurality of spaced-apart resilient tabs adapted to fit into said openings for releasably retaining the first and second cage member on the tray; and said cage members containing synthetic plastic foam for mounting flower stems therein.

5. A flower bouquet holder as claimed in claim 4 and further comprising a third cage member, the first, second and third cage members being shaped in plan view to fit within the tray rim.

6. A flower bouquet holder as claimed in claim 5 wherein the first, second and third cage members are identical in plan view.

7. A flower bouquet holder as claimed in claim 5 wherein the first, second and third cage members are shaped to form a heart in plan view.

8. A flower bouquet holder as claimed in claim 5 wherein the first, second and third cage members are shaped to form a diamond in plan view.

* * * * *